US008819386B1

(12) United States Patent
Mather

(10) Patent No.: US 8,819,386 B1
(45) Date of Patent: Aug. 26, 2014

(54) MEMORY EFFICIENT USE OF DYNAMIC DATA STRUCTURES USED TO MANAGE SPARSELY ACCESSED DATA

(75) Inventor: Clifford Mather, Pittsboro, NC (US)

(73) Assignee: EMC Corporation, Hopkinton, MA (US)

( * ) Notice: Subject to any disclaimer, the term of this patent is extended or adjusted under 35 U.S.C. 154(b) by 468 days.

(21) Appl. No.: 13/013,279

(22) Filed: Jan. 25, 2011

(51) Int. Cl.
*G06F 12/00* (2006.01)
*G06F 12/10* (2006.01)

(52) U.S. Cl.
CPC ..................................... *G06F 12/10* (2013.01)
USPC ........................................................ 711/202

(58) Field of Classification Search
CPC ............................................. G06F 12/00
USPC .................................. 711/215, 221, E12.014
See application file for complete search history.

(56) References Cited

U.S. PATENT DOCUMENTS

| | | | |
|---|---|---|---|
| 3,580,581 A | 5/1971 | Raven | |
| 3,961,169 A | 6/1976 | Bishop et al. | |
| 4,811,247 A | 3/1989 | Malady et al. | |
| 4,991,848 A | 2/1991 | Greenwood et al. | |
| 5,268,899 A | 12/1993 | Brown | |
| 5,515,477 A | 5/1996 | Sutherland | |
| 5,524,888 A | 6/1996 | Heidel | |
| 5,838,904 A | 11/1998 | Rostoker et al. | |
| 6,128,310 A | 10/2000 | Chow et al. | |
| 6,298,360 B1 | 10/2001 | Muller | |
| 6,315,289 B1 | 11/2001 | Sakamoto et al. | |
| 6,378,059 B1 | 4/2002 | Miyoshi | |
| 6,453,408 B1 | 9/2002 | Fiske et al. | |
| 6,886,164 B2 | 4/2005 | Meiri | |
| 6,961,313 B1 | 11/2005 | Gaspar | |
| 7,225,313 B2 | 5/2007 | Mather et al. | |
| 7,325,107 B2 | 1/2008 | Mather | |
| 7,516,297 B2 | 4/2009 | Mather | |
| 7,571,199 B1 | 8/2009 | Field et al. | |
| 7,782,926 B2 | 8/2010 | Myers | |
| 7,783,682 B1 | 8/2010 | Patterson | |
| 7,860,912 B1 | 12/2010 | Gyugyi et al. | |
| 8,001,353 B2 | 8/2011 | Mather et al. | |

(Continued)

OTHER PUBLICATIONS

Barrett, David, and Zorn, Benjamin, "Using Lifetime Predictors to Improve Memory Allocation Performance," SIGPLAN '93 Conference on Programming Language Design and Implementation, Albuquerque, New Mexico, Jun. 23-25, 1993, pp. 187-196, Association for Computing Machinery, New York, NY.

(Continued)

*Primary Examiner* — Brian Peugh
(74) *Attorney, Agent, or Firm* — Krishnendu Gupta; Jason Reyes; Deepika Bhayana

(57) ABSTRACT

When a dynamic data structure is used for managing sparsely accessed data stored in memory of a digital computer, pages of the memory are dynamically allocated and de-allocated to respective portions of the dynamic data structure so that the pages become distributed over the portions of the dynamic data structure and the de-allocated pages include free pages that are mapped in the dynamic data structure and free pages that are not mapped in the dynamic data structure. To reduce memory fragmentation and recover memory, upon de-allocating a page of memory from a portion of the data structure, a determination is made whether or not to un-map the de-allocated page from the portion of the dynamic data structure so that un-mapping of the de-allocated page has a probability that is the inverse of a superlinear function of the number of allocated pages in the portion of the dynamic data structure.

20 Claims, 11 Drawing Sheets

(56) References Cited

U.S. PATENT DOCUMENTS

| | | | |
|---|---|---|---|
| 8,028,009 B1 | 9/2011 | Patterson | |
| 2005/0193169 A1 | 9/2005 | Ahluwalia | |
| 2005/0223321 A1 | 10/2005 | Mather et al. | |
| 2006/0230246 A1 | 10/2006 | Mather et al. | |
| 2007/0094452 A1 | 4/2007 | Fachan | |
| 2008/0089355 A1 | 4/2008 | Lo et al. | |
| 2009/0088252 A1 | 4/2009 | Nicely et al. | |

OTHER PUBLICATIONS

IA-32 Intel® Architecture Software Developer's Manual, vol. 3, System Programming Guide, 2004, pp. 2-1 to 2-7 and 3-1 to 3-38, Intel Corporation, Santa Clara, CA.

Krapf, Andres, "Xen Memory Management (Intel IA-32)," Oct. 30, 2007, 6 pages, INRIA, Sophia Antipolis Cedex, France.

Kim, Jin-Soo, "IA32/Linux Virtual Memory Architecture," CS530: Graduate Operating Systems, Spring 2006, 31 pages, KAIST, Daejeon, Republic of Korea.

Memory Management Unit, Wikipedia, Dec. 13, 2010, 7 pages, Wikimedia Foundation, Inc., San Francisco, CA.

Vose, Michael D., "A Linear Algorithm for Generating Random Numbers With a Given Distribution," IEEE Transactions on Software Engineering, vol. 17, No. 9, Sep. 1991, pp. 972-975, IEEE, New York, NY.

Nacu et al., "Fast Simulation of New Coins from Old," The Annals of Applied Probability, 2004, vol. 15, No. 1A, pp. 93-115, Institute of Mathematical Statistics, Beachwood, OH.

"How do I simulate flip of biased coin in python?," May 24, 2009, stackoverflow.com, New York, NY.

Han et al., "Threshold Computation and Cryptographic Security," Nov. 12, 1992, 27 pages, University of Rochester, Rochester, NY.

Merkel, Benjamin E., "Probabilities of Consecutive Events in Coin Flipping," MS Thesis, University of Cincinnati, May 11, 2011, 25 pages, Cincinnati, OH.

Louge, Aaron, "Hardware Random Number Generators," Oct. 7, 2003, 3 pages, cryogenius.com.

Stewart, Jim, "Coin Toss Circuit," Nuts & Volt Magazine, Jun. 6, 2008, 5 pages, Jameco Electronics, Belmont, CA.

"UNC.RAN—Universal Non-Uniform RANdom number generators," Mar. 9, 2011, 3 pages, Vienna University of Economics and Business, Wien, Austria.

Webster's Seventh New Collegiate Dictionary, 1965, p. 678, G.C. Merriam Co., Springfield, MA.

Graff, Robert F, Modern Dictionary of Electronics, Sixth Edition, 1997, p. 780, 822, 823-825, Butterworth-Heinemann, Newton, MA.

Willoughby et al., Probability and Statistics, 1968, pp. 1-1613-4, 43-53, General Learning Corporation, Morristown, NJ.

Papoulis, Athanasios, Probability, Random Variables, and Stochastic Processes, 1965, pp. 1-269, McGraw-Hill Book Company, New York, NY.

Bjorken et al., Relativistic Quantum Mechanics, 1964, pp. 2-3, McGraw-Hill, Inc., New York, NY.

Compaq Fortran Language Reference Manual, Sep. 1999, Sec. 9.3.126, Compaq Computer Corporation, Houston, TX.

IBM Basic Programming Rnd Function, Sep. 30, 2010, one page, International Business Machines Corp., Armonk, NY.

GW-Basic User's Guide, RND Function, 1987, two pages, Microsoft Corp., Redmond, WA.

Basic Language Reference Manual, RND operator, p. 3-11, Apr. 2000, Rockwell International Corporation, Milwaukee, WI.

ISO/IEC 9899:1999, Programming Languages—C, WG14/N1124 Committee Draft May 6, 2005, pp. 312-313, International Standards Organization, Geneva, Switzerland.

Fiori, Simone, "Generation of Pseudorandom Numbers with Arbitrary Distribution by Learnable look-Up-Table-Type Neural Networks," IEEE World Congress on Computational Intelligence, IJCNN 2008, Jun. 1-8, 2009, Conference Proceedings pp. 1787-1792, Hong Kong, China, IEEE, New York, NY.

Wang et al., "Pseudo Random Number Generator Based on Hopfield Neural Network," Proceedings of the Fifth International Conference on Machine Learning and Cybernetics, Dylian, Aug. 13-16, 2006, pp. 2810-2813, IEEE, New York, NY.

Desai et al., "Pseudo-random number generator using time delay neural network," World Journal of Science and Technology 2012, Vo. 2, No. 10, pp. 165-169, World Journal of Science and Technology, Karnataka, India.

Thomas et al., "Non-Uniform Random Number Generation Through Piecewise Liner Approximations," International Conference on Field Programmable Logic and Applications, Madrid, Spain, Aug. 28-30, 2006, 8 pages, IEEE, New York, NY.

"Sample_Space" lecture of the Data Organization Course, Comp2011/2711, Semester 1, 2006, 44 pages, at the University of New South Wales, Sydney, Australia.

Tsang, W. W., "Random Number Generation and Testing," Sep. 24, 2006, 55 pages, University of Hong Kong, Hong Kong, China.

NAG Library Manual, "Introduction—G05 Random Number Generators," Jan. 2009, 17 pages, The Numerical Algorithms Group Ltd, Oxford, England.

Voss, Michael D., "A Linear Algorithm for Generating Random Numbers With a Given Distribution," IEEE Transactions on Software Engineering, vol. 17, No. 9, Sep. 1991, pp. 972-975, IEEE, New York, NY.

Chu, Peter L., "Fast Gaussian Noise Generator," IEEE Transactions on Acoustics, Speech, and Signal Processing, vol. 37, No. 10, Oct. 1989, pp. 1593-1597, IEEE, New York, NY.

Marsaglia et al., "Fast Generation of Discrete Random Variables," Journal of Statistical Software, Jul. 2004, vol. 11, Issue 3, pp. 1 to 3, American Statistical Association, Alexandria, VA.

Cohen, Josh D., "Fairing of Biased Coins in Bounded Time," Technical Report YALEU/DCS/TR-372, Mar. 1985, 25 pages, Yale University, New Haven, CT.

Guo, Hong, Wei Wei, "Quantum random number generator based on the photon number decision of weak laser pulses," Pacific Rim Conference on Lasers and Electro-Optics, Shanghi, China, Aug. 31-Sep. 3, 2009, IEEE, New York, NY.

Clifford Mather, Inventor Declaration in Mather et al. U.S. Patent 7,225,313 issued May 29, 2009.

Clifford Mather, Inventor Declaration in Mather U.S. Patent 7,325,107 issued Jan. 29, 2008.

Clifford Mather, Inventor Declaration in Mather U.S. Patent 7,516,297 issued Apr. 7, 2009.

Clifford Mather, Inventor Declaration in and Mather et al. U.S. Patent 8,001,353 issued Aug. 16, 2011.

Dahlin et al., "A quantitative analysis of cache policies for scalable network file systems," Proceedings of the 1994 ACM SIGMETRICS conference on Measurement and modeling of computer systems, Vanderbilt University, Nashville, Tennessee, May 16-20, 1994, 13 pages, Association for Computing Machinery, New York, NY.

Mather, Cliff, LinkedIn fill profile, Aug. 30, 2013, 3 pages, LinkedIn Corporation, Mountain View, CA.

"PGA-308 Cooled Single Photon Counting Avalanche Photodiode—Fiber Pigtailed," Sep. 10, 2010, 3 pages, Princeton Lightwave Inc., Cranbury, NY.

"SPCM-AQRH Single Photon Counting Module," May 2013, 12 pages, Excelitas Technologies, Vaudreuil, Quebec, Canada.

Kenney, John F., Mathematics of Statistics, Part One, 1939, pp. 7-32, D. Van Nostrand Company, New York, NY.

Nevada Revised Statutes, NRS465.085(b), Jan. 16, 2013, 5 pages, State of Nevada, Nevada Legislature, Carson City, NV.

Nevada Gaming Commission Regulation 14, Jun. 2013, 30 pages, Nevada Gaming Commission, Carson City, NV.

Nevada Gaming Control Board New Gaming Device Submission Package Nov. 22, 2010, 34 pages, Nevada Gaming Control Board, Las Vegas, NV.

Turdean, Cristina, "Computerizing Chance: The Digitization of the Slot Machine (1960-1985)," Occasional Paper Series 15, Mar. 2012, 8 pages, Las Vegas: Center for Gaming Research, University Libraries, University of Nevada Las Vegas, NV.

C36 Lee, Kah-Wee, "Containment and Virtualization: Slot Technology and Remaking of the Casino Industry," Occasional Paper Series

(56) References Cited

OTHER PUBLICATIONS

14, Feb. 2013, 20 pages, Las Vegas: Center for Gaming Research, University Libraries, University of Nevada Las Vegas, NV.
Nevada Gaming Statistics: June Comparison, Executive Summary of 10-Year Revenue and Handle Trends, 6 pages, Las Vegas: Center for Gaming Research, University Libraries, University of Nevada Las Vegas, NV.
"Gaming Revenue Report, Year Ended Dec. 31, 2011," 2012, 48 pages, Nevada State Gaming Control Board, Las Vegas, NV.
"Electronic Gaming Equipment Minimum Technical Standards," Version 1.00, Dec. 2007, Alcohol and Gaming Commission of Ontario, Toronto, Ontario, Canada.
Binder et al.,"Adaptive Probabilistic Networks with Hidden Variable," Machine Learning, vol. 29, pp. 213-244, 1997, Kluwer Academic Publishers, Netherlands.
Bohm, David, "A Suggested Interpretation of the Quantum Theory in terms of "Hidden" Variables. I", Physical Review, vol. 85 No. 2, Jan. 15, 1952, pp. 166-179, American Physical Society, College Park, MD.
Gunther et al., "neuralnet: Training of Neural Networks," The R Journal vol. 2 No. 1, Jun. 2010, pp. 30-38, Institute for Statistics and Mathematics of WU, Wirtschaftsuniversität, Wien, Germany.
Nguyen et al., "A Wide Frequency Range and Adjustable Duty Cycle CMOS Ring Voltage Controlled Oscillator," Third International Conference on Communications and Electronics, Nha Trang, Vietnam, Aug. 11-13, 2010, pp. 105-107, IEEE, New York, NY.
Itzler et al., "InP-based Geiger-mode avalanche photodiode arrays for three-dimensional imaging at 1.06 µm," Proc. of SPIE vol. 7320, 14 pages, Apr. 2009, SPIE, Bellingham WA.
Mishra, "FPGA Based Random Number Generation for Cryptographic Applications," BSEE Thesis, 2012, National Institute of Technology, Rourkela, India.
Jun et al., "The Intel (R) Random Number Generator," White Paper, Apr. 22, 1999, 8 pages, Cryptography Research, Inc., San Francisco, CA.
Metropolis, N., "The Beginning of the Monte Carlo Method," Los Alamos Science Special Issue 1987, pp. 125-130, Los Alamos National Laboratory, Los Alamos, NM.
Cheung et al., "Hardware Generation of Arbitrary Random Number Distributions From Uniform Distributions Via the Inversion Method," IEEE Transactions on Very Large Scale Integration (VLSI) Systems, vol. 15, No. 8, Aug. 2007, pp. 952-962, IEEE, New York, NY.
Schryver et al., "A New Hardware Efficient Inversion Based Random Number Generator for Non-Uniform Distributions," 2010 International Conference on Reconfigurable Computing, Cancun, Quintana Roo, Mexico, Dec. 13-15, 2010, pp. 190-195, IEEE, New York, NY.
Viaweswariah et al., "Source Codes as Random Number Generators," IEEE Transactions on information Theory, vol. 44, No. 2, Mar. 1998, pp. 462-471, IEEE, New York, NY.

| PAGE TABLE | COUNT OF ALLOCATED PAGES | COUNT OF FREE AND MAPPED PAGES |
|---|---|---|
| 0 | 1013 | 15 |
| 1 | 942 | 50 |
| 2 | 507 | 432 |
| 3 | 309 | 542 |
| ⋮ | ⋮ | ⋮ |

| VIRTUAL PAGE TABLE |  |
|---|---|
| FREE AND UN-MAPPED | 161 |
| ALLOCATED AND FILLING | 162 |
| ALLOCATED AND EVACUATING | 163 |

MEMORY EFFICIENT USE OF DYNAMIC DATA STRUCTURES USED TO MANAGE SPARSELY ACCESSED DATA

FIELD OF THE INVENTION

The present invention generally relates to dynamic allocation of memory in a digital computer, and more specifically to dynamic data structures used to manage sparsely accessed data in the dynamically allocated memory.

BACKGROUND OF THE INVENTION

As used herein, "memory" in a digital computer refers to a physical device that can store data in it and from which the data can be retrieved. Thus, the term "memory" as used herein encompasses random access main memory, such as static or dynamic random access memory integrated circuit chips, as well as direct access data storage, such as disk drives.

As used herein, "dynamic allocation of memory" is the allocation of data storage locations in memory as the data storage locations are needed during execution of a program, so that a set of allocated data storage locations is assigned to a program task. For example, an array is a set of contiguous data storage locations named in a computer program.

A digital computer typically includes memory and an operating system program that permits the memory to be dynamically allocated and freed during execution of an application program. The process of dynamically allocating and freeing the memory typically results in the data in the memory becoming sparsely accessed. To deal with this problem, a dynamic data structure is often used for managing access to the sparsely-accessed data. The dynamic data structure itself grows and shrinks dynamically as the memory is allocated and freed. However, the natural tendency is for the dynamic data structure to grow until reaching a limit set in the operating system program. In addition, this growth of the dynamic data structure typically does not reduce the processing time for managing access to the sparsely-accessed data. Instead, the performance may degrade as the dynamic data structure grows and reaches the limit set in the operating system program.

For example, the operating system of a digital computer typically permits an application process to sparsely access data in a virtual address space. The operating system typically maintains a dynamic data structure in the form of a multilevel table for translating the virtual addresses to physical memory addresses. Such multilevel tables are used in the Intel Corporation x86, Sun Corporation SPARC, and other central processing unit (CPU) architectures. During use, the memory that is dynamically allocated to the application programs tends to become distributed over the virtual address space. Consequently, the multilevel table tends to grow in size until reaching a limit set in the operating system program.

SUMMARY OF THE INVENTION

The present invention is directed to memory efficient use of a dynamic data structure used to manage sparsely accessed data in dynamically allocated memory of a digital computer. Such a dynamic data structure uses less physical memory when the accessed data is more co-located in the data structure. Over time, however, portions of the data structure tend to become sparsely populated with the accessed data, so that the data structure tends to use more physical memory. The present invention recognizes that there is an opportunity to make the dynamic data structure more memory efficient by providing a way of recovering memory from sparsely populated portions of the dynamic data structure. An example of such a dynamic data structure is a multi-level page table used for translating virtual addresses to physical address of pages of memory. In such an example it is desired to provide a way of recovering the memory of page tables that become sparsely populated with pages of data. These properties and problems, however, are not limited to multi-level page tables used for virtual-to-physical address translation. These properties and problems occur with other kinds of dynamic data structures, such as dynamic trees, that are used to manage other kinds of sparsely accessed data.

In accordance with one aspect, the invention provides a method of using a dynamic data structure for managing sparsely accessed data stored in memory of a digital computer. The method includes a data processor of the digital computer executing computer instructions stored in a non-transitory computer readable storage medium to perform the steps of: (a) dynamically allocating and de-allocating pages of the memory to respective portions of the dynamic data structure so that allocated pages of the memory and de-allocated pages of the memory become distributed over the portions of the dynamic data structure, and the de-allocated pages of the memory include free pages that are mapped in the dynamic data structure and free pages that are not mapped in the dynamic data structure; and then (b) upon de-allocating an allocated page of the memory from one of the portions of the dynamic data structure, determining whether or not to un-map the de-allocated page from the one of the portions of the dynamic data structure so that un-mapping of the de-allocated page from the one of the portions of the dynamic data structure has a probability that is the inverse of a superlinear function of the number of allocated pages in the one of the portions of the dynamic data structure; and (c) in response to step (b) determining to un-map the de-allocated page from the one of the portions of the dynamic data structure, un-mapping the de-allocated page from the one of the portions of the dynamic data structure.

In accordance with another aspect, the invention provides a digital computer comprising a data processor, memory, and a non-transitory computer readable storage medium storing computer instructions. The computer instructions, when executed by the data processor, use a dynamic data structure for managing sparsely accessed data in the memory by performing the steps of: (a) dynamically allocating and de-allocating pages of the memory to respective portions of the dynamic data structure so that allocated pages of the memory and de-allocated pages of the memory become distributed over the portions of the dynamic data structure, and the de-allocated pages of the memory include free pages that are mapped in the dynamic data structure and free pages that are not mapped in the dynamic data structure; and then (b) upon de-allocating an allocated page of the memory from one of the portions of the dynamic data structure, determining whether or not to un-map the de-allocated page from the one of the portions of the dynamic data structure so that un-mapping of the de-allocated page from the one of the portions of the dynamic data structure has a probability that is the inverse of a superlinear function of the number of allocated pages in the one of the portions of the dynamic data structure; and (c) in response to step (b) determining to un-map the de-allocated page from the one of the portions of the dynamic data structure, un-mapping the de-allocated page from the one of the portions of the dynamic data structure.

In accordance with a final aspect, the invention provides a non-transitory computer-readable storage medium containing computer instructions. The computer instructions, when executed by a data processor, perform the steps of: (a) dynamically allocating and de-allocating pages of the memory to respective portions of the dynamic data structure so that allocated pages of the memory and de-allocated pages of the memory become distributed over the portions of the dynamic data structure, and the de-allocated pages of the memory include free pages that are mapped in the dynamic data structure and free pages that are not mapped in the dynamic data structure; and then (b) upon de-allocating an allocated page of the memory from one of the portions of the dynamic data structure, determining whether or not to un-map the de-allocated page from the one of the portions of the dynamic data structure so that un-mapping of the de-allocated page from the one of the portions of the dynamic data structure has a probability that is the inverse of a superlinear function of the number of allocated pages in the one of the portions of the dynamic data structure; and (c) in response to step (b) determining to un-map the de-allocated page from the one of the portions of the dynamic data structure, un-mapping the de-allocated page from the one of the portions of the dynamic data structure.

BRIEF DESCRIPTION OF THE DRAWINGS

Additional features and advantages of the invention will be described below with reference to the drawings, in which:

FIG. 11 shows a table of counts of allocated pages and counts of free and mapped pages in the multi-level page table of FIG. 3;

FIG. 12 shows states of a virtual page table in the multi-level page table of FIG. 3;

Figure 1:
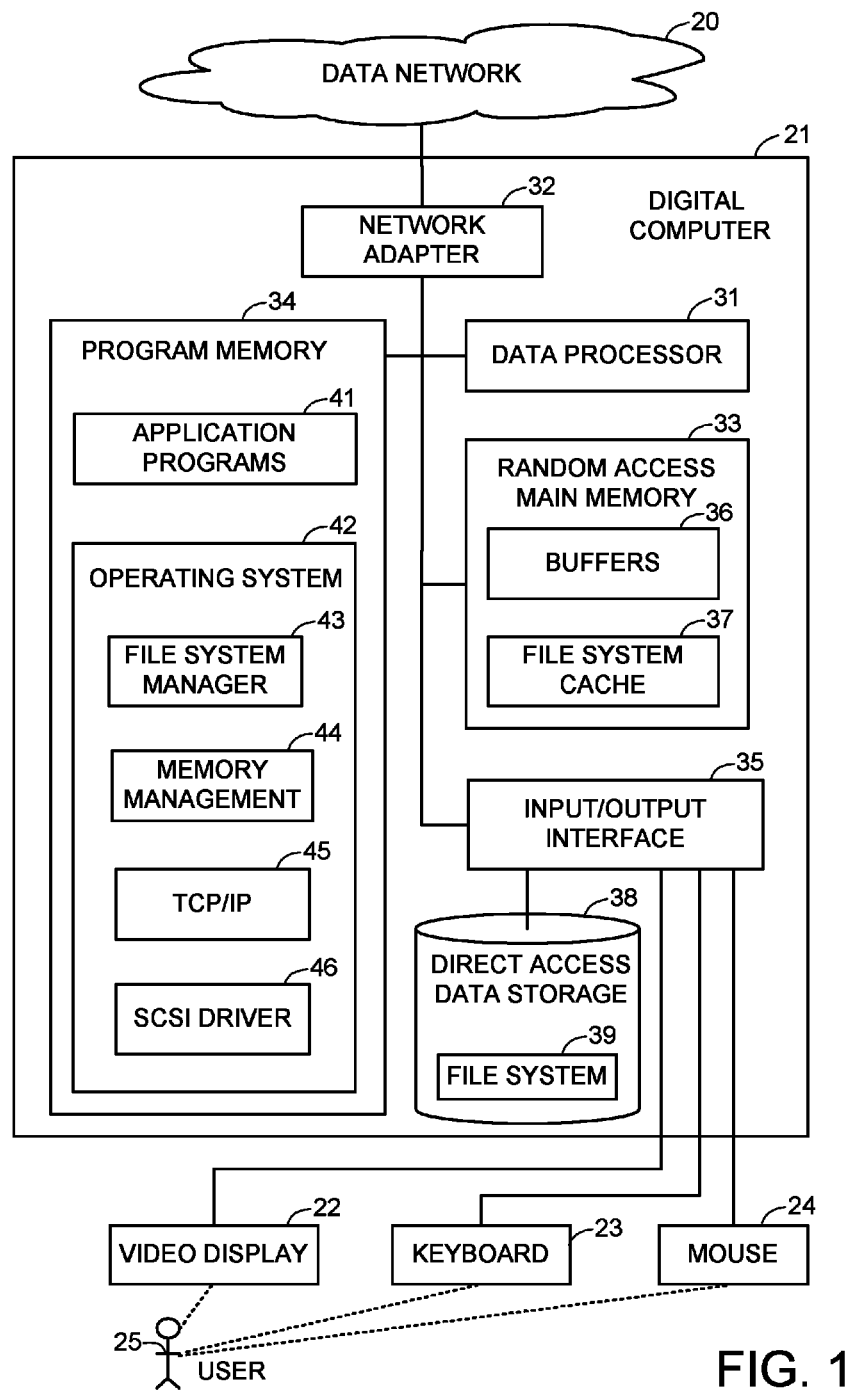
FIG. 1 is a block diagram of a digital computer.

While the invention is susceptible to various modifications and alternative forms, a specific embodiment thereof has been shown in the drawings and will be described in detail. It should be understood, however, that it is not intended to limit the invention to the particular form shown, but on the contrary, the intention is to cover all modifications, equivalents, and alternatives falling within the scope of the invention as defined by the appended claims.

DETAILED DESCRIPTION OF THE PREFERRED EMBODIMENT

With reference to FIG. 1, there is shown a digital computer 21 having a video display 22, a keyboard 23, and a computer mouse 24 for operation by a human user 25. The computer 21 includes a data processor 31, a network adapter 32 for linking the data processor to a data network 20 such as the Internet, random access main memory 33, a program memory 34, and an input/output interface 35. The data processor 31 is a general purpose digital computer data processor including one or more core central processing units (CPUs) for executing computer program instructions stored in the program memory 34. The random access main memory 33 provides buffers 36 and a file system cache 37. The input/output interface 35 interconnects the data processor 31 to a hard disk drive 39 providing direct access data storage, and to the input/output devices including the video display 22, keyboard 23, and computer mouse 24.

The program memory 34 is a non-transitory computer readable storage medium, such as electrically erasable and programmable read-only memory (EEPROM). In general, non-transitory computer readable storage medium is a physical device or physical material which serves to store computer-readable data on a permanent or semi-permanent basis. Examples of other kinds of non-transitory computer readable storage medium include magnetic disks, magnetic tape, and optical disks.

The program memory 34 stores application programs 41 and an operating system program 42. The application programs permit the digital computer 21 to perform specific tasks. For example, the digital computer 21 can be programmed with an application program so that the digital computer 21 functions as a network file server. In this case, the application program performs the task of responding to requests from clients in the data network 20 for access to files in the file system 39 in the direct access data storage 38.

The operating system program 42 includes a file system manager 43, a memory management program 44, a network communication program layer 45, and a Small Computer Systems Interface (SCSI) driver 46. The file system manager 43 provides access to a file system 39 in direct access data storage 38, and also maintains the file system cache 37 in the random access main memory 33. The memory management program 44 dynamically allocates memory to the application programs 41 during execution of the application programs. The network communication program layer 45 provides communication over the data network 20 using the Transmission Control Protocol (TCP) over the Internet Protocol (IP). The Small Computer Systems Interface (SCSI) driver 46 provides access to the hard disk drive 38.

Figure 2:
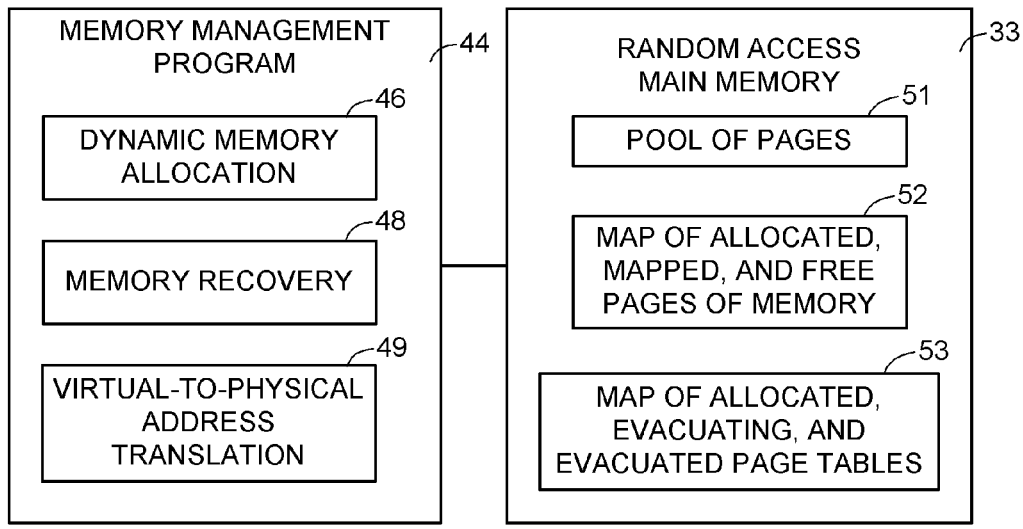
FIG. 2 shows additional components of the digital computer for dynamic allocation of memory.

FIG. 2 shows additional components of the memory management program 44. The memory management program 44 includes a dynamic memory allocation routine 46, a memory recovery routine 48, and a virtual-to-physical address translation routine 49.

The pages of memory are allocated from a pool of pages 51 in the random access main memory 33. Each page of memory is a group of contiguous data storage locations. For example, each page is aligned on a physical memory address boundary and has a size of four kilobytes. At any given time, each page in the pool 51 is either allocated or free. The random access main memory 33 includes a map 52 indicating whether each page in the pool 51 is allocated or free. For example, the map 52 is a bit map having a unique bit corresponding to each page in the pool 51, and the bit is a logic zero if the corresponding page is free, and the bit is a logic one if the corresponding page is allocated. The random access main memory 33 also includes a map 53 of allocated, evacuating, and evacuated page tables. The map 53 of the page tables includes a page directory (63 in FIG. 3) and is used by the memory recovery routine 48 as further described below.

Figure 3:
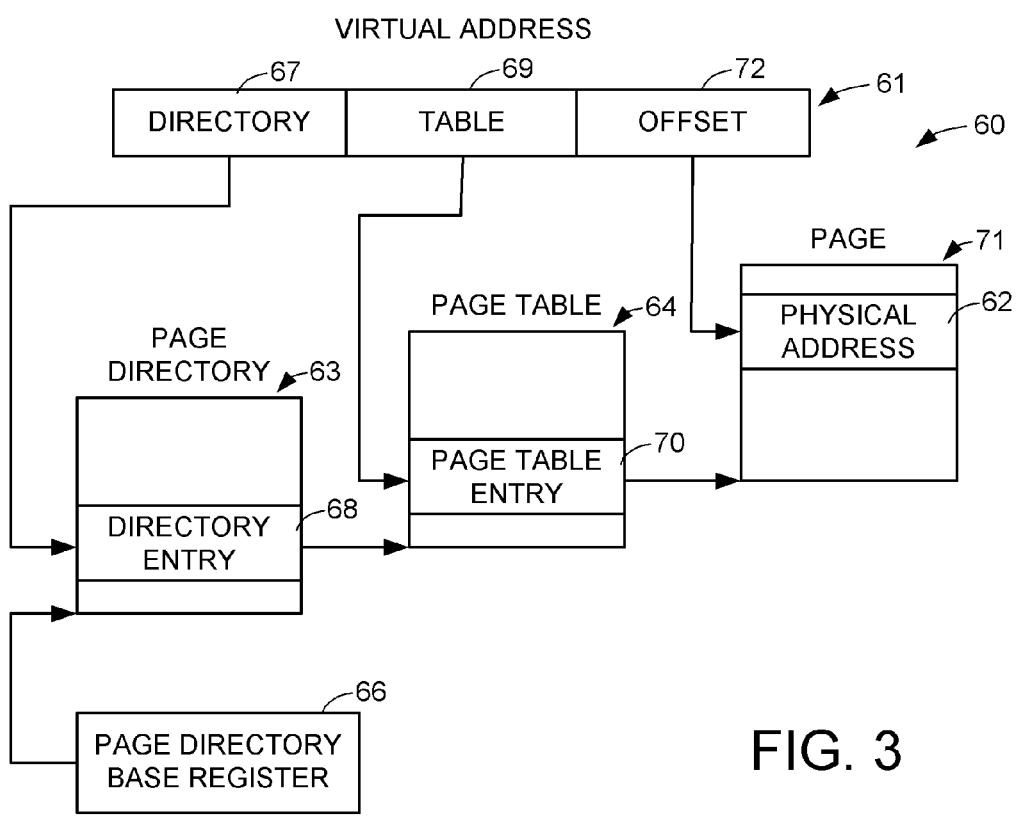
FIG. 3 is a block diagram of a multi-level page table for virtual-to-physical address translation.

FIG. 3 shows a multi-level page table data structure 60 used for translating a virtual address 61 to a physical address of a memory location 62 in a page 66 of the main memory. A page directory base register 66 provides a base address of a page directory 63. The page directory base register 66 is a particular register of the data processor (31 in FIG. 1). A directory field 67 of the virtual address 61 provides an index for indexing the page directory 63 to select a particular directory entry 68 in the page directory 63. For example, the directory field 67 consists of the ten most significant bits of the virtual address 61. The directory entry 68 provides a base address of a page table 64. A table field 68 of the virtual address 61 provides an index for indexing the page table 64 to select a particular page table entry 70 in the page table 64. For example, the table field 69 consists of bits 21 to 12 of the virtual address 61. The page table entry 70 provides a base address of a page 71 of physical memory. An offset field 72 of the virtual address 61 provides an index for indexing the page 71 of physical memory to select the particular memory location 62 in the page. For example, the offset field 72 consists of the twelve least significant bits of the virtual address 61.

In practice, the multi-level page table data structure 60 is a dynamic data structure used to manage sparsely accessed data. In general, at any given time, only a fraction of the virtual addresses capable of addressing the multi-level data structure 60 will actually be addresses of physical pages of physical memory. Another way of describing this situation is to say that each virtual address capable of addressing the multi-level data structure 60 addresses a virtual page of memory, which may or may not have a corresponding physical page of memory presently allocated to the virtual page of memory. Before physical memory is allocated to a virtual page of memory, the virtual page of memory just represents a unique range of contiguous virtual addresses associated with the virtual page.

To avoid a translation fault, an application process should only address virtual addresses of the virtual pages that have been allocated physical pages of memory. For example, an application process requests the dynamic memory allocation routine (46 in FIG. 2) for one or more pages of virtual memory, and the dynamic memory allocation routine responds by searching for free virtual pages of memory, allocating and mapping physical pages of memory to the virtual pages of memory, allocating these virtual pages to the application process, and then returning to the application process the virtual addresses of the virtual pages of memory that have been allocated to the application process.

The multi-level page table data structure 60 is used in a memory efficient manner by dynamically allocating physical memory for the page tables as the page tables are needed for translating the virtual addresses of the virtual pages that have been allocated physical memory. Therefore the multi-level page table data structure 60 may be described also as a hierarchy including virtual page tables for all of the virtual pages of virtual memory. Before physical memory is allocated to a virtual page table, the virtual page table just represents a unique range of contiguous virtual addresses associated with the virtual page table, and spanning the virtual addresses of all of the virtual pages mapped by the virtual page table. Before a page of physical memory is allocated and mapped to a virtual page, physical memory is allocated to the virtual page table including the virtual page so that the virtual page table may store the base address of the physical page mapped to the virtual page.

Figure 4:
FIG. 4 shows allocated and free pages in a virtual address space before a process of memory fragmentation.

FIG. 4 shows allocated pages 101 and free pages 102 in a virtual memory address space 100 for an application process before virtual memory fragmentation occurs. In this context, an allocated page in the virtual address space 100 is a page of virtual memory that has a corresponding page of physical memory that is allocated and mapped to it. A free page of virtual memory may or may not presently have a physical page mapped to it. For example, if a virtual-to-physical address translation were performed upon a page of virtual memory that was not allocated to a corresponding allocated page of physical memory, then the translation process would return an error indicating that the page of virtual memory was not presently allocated to a corresponding page of physical memory, for example, because the corresponding directory entry or page table entry would be flagged to indicate that that there was no corresponding page of physical memory presently allocated to it.

Initially the virtual address space 100 includes a lower extent of the allocated virtual pages 101 and an upper extent of free virtual pages 102. This is an ideal case in which the allocated virtual pages are localized as much as possible in the virtual address space. However, when an application process first begins execution and requests allocation of pages of dynamically allocated memory, it is easy to map the virtual addresses consecutively to the allocated pages simply by loading the base addresses of the allocated physical pages into one or more page tables, so that the ideal case or a nearly ideal case is obtained initially. This locality of the virtual memory for an application process reduces the amount of memory required for the page tables used in the virtual-to-physical address translation, and also increases the performance of the digital computer (21 in FIG. 1). The locality of the virtual memory increases the likelihood that address translation caches and data caches in the digital computer will contain the addresses and data for access to the virtual pages of memory.

Figure 5:
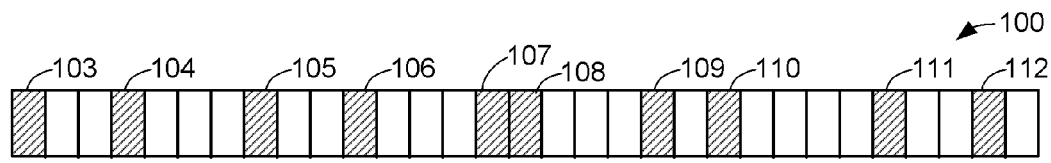
FIG. 5 shows allocated and free pages in the virtual address space after a process of memory fragmentation.

FIG. 5 shows allocated virtual pages (which are cross-hatched) and free virtual pages (which are not cross-hatched) in the virtual memory address space 100 after a process of memory fragmentation. The allocated pages 103, 104, 105, 106, 107, 108, 109, 110, 111, and 112 have become more or less randomly distributed over the virtual memory address space 100. As the dynamically-allocated virtual memory is freed and re-allocated, the virtual memory address space tends to become fragmented, so that the largest extent of contiguous allocated virtual memory address locations becomes much smaller than the virtual memory address space. For example, the largest extent of contiguous allocated virtual memory address locations has been reduced from 21 pages in FIG. 4 to four pages in FIG. 5. In general, for a more realistic example where a large number of pages tables would be need for translating the virtual addresses of the allocated pages in the entire virtual address space, this fragmentation of the virtual memory increases the number of page tables needed for the virtual-to-physical translation, and decreases the performance of the application program due to the inability to obtain locality of access to the allocated memory.

In practice, the virtual memory fragmentation process results from a combination of a natural tendency for entropy to increase, and a tendency for the application programs to request allocation of pages that are contiguous in the virtual address space. If the allocation routine would perform a random selection of a free page for the allocation, then fragmentation would result from the natural tendency for entropy to increase. The tendency for an application to request allocation of contiguous pages accelerates the natural fragmentation process because there is a bias towards allocating pages from regions of the virtual memory address space that are relatively unpopulated with allocated pages. Yet the allocation of pages that are contiguous in the virtual address space is desired to increase performance at least in the short term for the requesting application program by enhancing the locality of access of the application program to this allocated memory.

The present invention recognizes that when the virtual address space 100 is approaching the degenerate state as show in FIG. 5, the multi-level page table structure 60 in FIG. 3 is also becoming larger and more complex, so that it is worthwhile to spend some data processor cycles to reorganize the virtual memory by re-organizing the page tables so that the virtual memory is less fragmented and some of the memory allocated to the page tables can be recovered. In particular, the page tables are re-organized by moving free and mapped pages from one part of the multi-level page table data structure to another. In other words, pages are unlinked from one page table and re-linked to another page table. If this is done judiciously, then it is possible to keep available for the applications a supply of large contiguous regions of free virtual memory pages. If an entire page table is evacuated of allocated pages and free and mapped pages, then the physical memory of the page table can be recovered.

Although random allocations and purges tend to produce the fragmented state as shown in FIG. 5, randomness will occasionally produce some regions in the virtual address space that are more densely populated with allocated pages and other regions that are less densely populated with allocated pages, but the natural tendency is for these density variations to be short lived. Once a region spontaneously becomes sparse, intervention is required to make the region tend toward more sparseness. Then the regions would tend to segregate into two groups—one group that is sparsely populated, and another group that is more densely populated. At this point, free and mapped pages can be freed from the dynamic data structure with a minimum of effort.

In the case of the multi-level page table of FIG. 3, the regions of interest are the page tables, because the memory of a page table can be freed once the page table is evacuated of allocated pages and any free and mapped pages in the page table have been un-mapped from the page table. In the case of a page table, an opportune time to decide whether or not to un-map a page from the page table is when the page of the page table is de-allocated, but not necessarily un-mapped. If a page is de-allocated and its page table is found to be sparsely populated with allocated pages at this time, then it likely to be a good time to un-map the page. It is easy to de-allocate a page in a page table without un-mapping the page because the de-allocation can be done by changing a flag in the page table entry for the page. Un-mapping of a page takes some additional processing time, so that if a page is de-allocated but it will take much more time for the page table to be evacuated of allocated pages, then it might not be worth the processing time to un-map the page right away. On the other hand, if a page is de-allocated and it will not take much more time for the page table to be evacuated of allocated pages, then it might be worth the processing time to un-map the page right away.

In this case, un-mapping the page right away would accelerate recovery of the memory of the page table as soon as the page table becomes evacuated of allocated pages.

Figure 6:
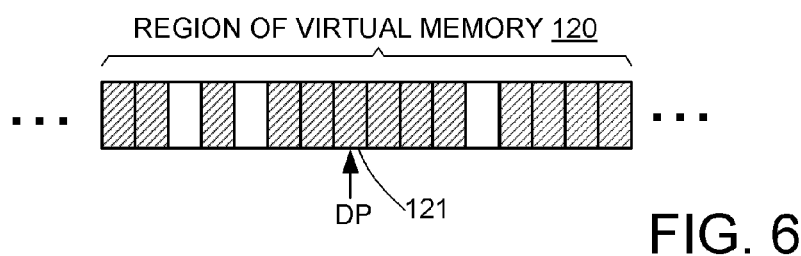
FIG. 6 shows de-allocation of a page of memory from a neighborhood populated with a majority of allocated pages.
Figure 7:
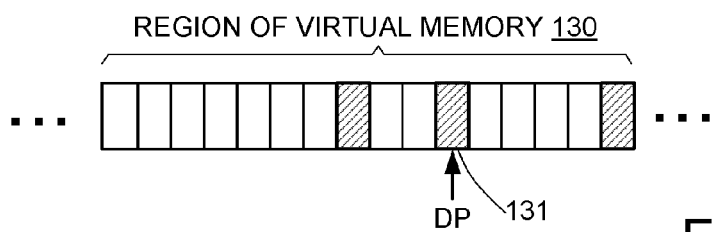
FIG. 7 shows de-allocation of a page of memory from a neighborhood sparsely populated with allocated pages.

FIGS. 6 and 7 show a general approach of deciding whether or not to un-map a page when a page is de-allocated. The de-allocated page resides in a particular neighborhood of the virtual address space corresponding to an allocated region of the data structure. When this neighborhood of the virtual address space is becoming evacuated of allocated pages, the density of allocated pages in this neighborhood provides an indication of the likelihood that that the benefit of immediately un-mapping the allocated page from the allocated region of the data structure would justify the processing time required for the un-mapping process. In particular, to justify the cost of un-mapping a de-allocated page, the probability of un-mapping the page should be proportional to the inverse of a superlinear function of the number of allocated pages in the neighborhood of the de-allocated page. A superlinear function is a function that increases faster than a linear function.

FIG. 6, for example, shows de-allocation of a page 121 from a region 120 of the virtual memory address space that is populated with a majority of allocated pages. The virtual memory address of the de-allocated page 121 is the value of a de-allocation pointer (DP). In this case, once the page 121 is freed, the region 120 containing the page 121 will have four pages free, and thirteen pages allocated. The probability of immediately un-mapping the de-allocated page will be proportional to $(1/F(13))$, where $F(X)$ is a superlinear function. Since thirteen is relatively large, the probability of immediately un-mapping the de-allocated page is relatively small.

FIG. 7, for example, shows de-allocation of a page 131 from a region 130 of the virtual memory address space that is sparsely populated with allocated pages. The virtual memory address of the de-allocated page 131 is the value of the de-allocation pointer (DP). In this case, once the page 131 is freed, the region containing the page 131 will have fourteen pages free, and two pages allocated. The probability of immediately un-mapping the de-allocated page will be proportional to $(1/F(2))$. Since two is relatively small and $F(X)$ is superlinear, the probability of immediately un-mapping the de-allocated page is high and grows faster as all of the pages in the region become free.

For the example of the multi-level page table data structure 60 of FIG. 1, the relevant region is the virtual address range of the page table that includes the de-allocated page, so that the page table can be evacuated and its physical memory can be recovered once the entire page table is evacuated of allocated pages. In this case, the density of allocated pages in the page table is most conveniently obtained by fetching a per-region running count from a table of running counts, as further described below with reference to FIG. 11. In a more general example, the de-allocation routine may obtain a density of allocated pages in the neighborhood of the de-allocated page in the memory address space or in the data structure by examining the allocation status of neighboring pages to compute the density. Examination of the allocation status of neighboring pages to compute the density can be done by a sequence of instructions that accumulate the density while testing the allocated or free status of the neighboring pages in a map of allocated pages (e.g., the map 52 in FIG. 2).

Figure 8:
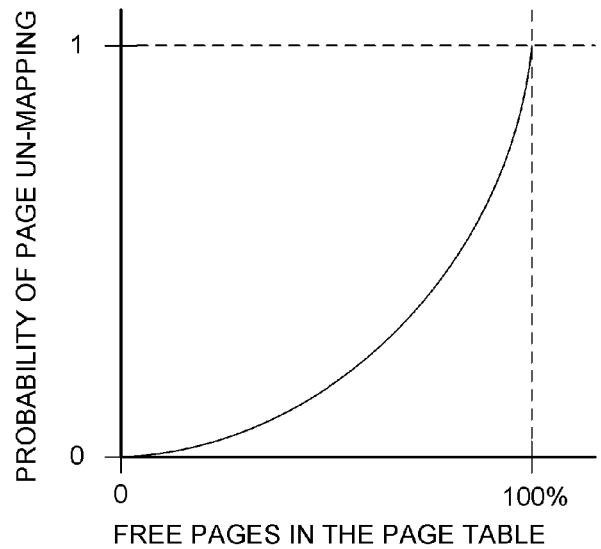
FIG. 8 shows a graph of an un-mapping probability function of the percentage of free pages in a page table.

The desired probability of immediately un-mapping a de-allocated page from a page table as a function of the allocated or free pages in the page table is shown in FIG. 8. In FIG. 8, the probability (P) of page un-mapping has been normalized to range from zero to one, and the density (r) of free pages in a page table has been normalized to range from zero to 100 percent. In this example, the probability (P) of page un-mapping is a superlinear function of the density of free pages when the page table is sparsely populated with allocated pages. For example, the probability function is $P=r^n$, where the exponent "n" is a constant greater than one. The constant "n" can be freely selected, yet the probability will have desired values of zero for the case of all of the pages are allocated in the page table, and a probability of one for the case of the page table becoming evacuated when the last allocated page of the page table is de-allocated. Therefore the exponent "n" can be selected to introduce an appropriate level of intervention to cause evacuation of a page table when a page table spontaneously becomes sparse.

To simplify the computation, a probability function as shown in FIG. 8 can be also computed as proportional to the inverse of a superlinear function of the number (x) of remaining allocated pages in the page table, such as: $P=m/(x^2)-k$, where "m" is a proportionality constant, and "k" is an additive term. The constants "m" and "k" can be selected to obtain desired values at the endpoints of the range for which the page table is sparsely populated with allocated pages. In this example, the exponent of "2" is selected to introduce an appropriate trade-off between the processing cost of immediately un-mapping the de-allocated page and the benefit of accelerating the recovery of the physical memory of the page table as soon as the page table has been entirely evacuated of allocated pages.

Figure 9:
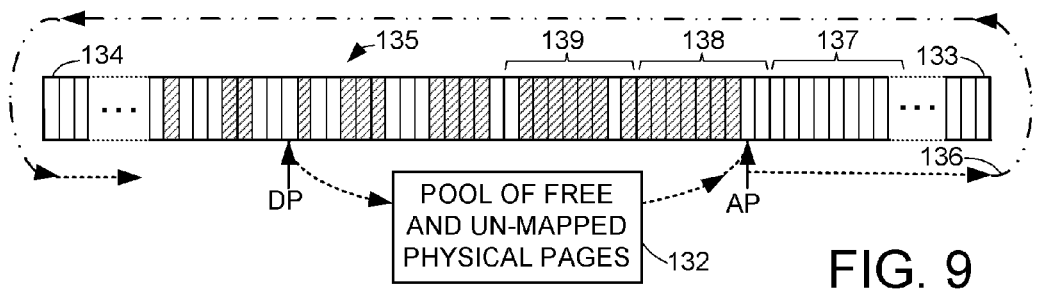
FIG. 9 shows a virtual memory address space including a distribution of allocated pages resulting from a specific method of page allocation and de-allocation.

FIG. 9 shows a specific example of an allocation mechanism used in connection with the page and page table memory recovery process to keep available for an application a supply of large contiguous regions of free virtual memory pages in a virtual address space 135. When a page of free memory is un-mapped at the virtual memory address of the de-allocation pointer (DP), the page of physical memory is returned to a pool 132 of free and un-mapped physical pages. When an application process requests a page of memory, a page of free and un-mapped memory is taken from the pool 132 and allocated and mapped to a virtual address at an allocation pointer (AP), and then the allocation pointer is incremented. In this fashion, once a sufficiently large number of pages of memory are allocated to and de-allocated from the application process, the allocation pointer (AP) will advance until it reaches the top end 133 of the virtual address space. When the allocation pointer (AP) is incremented at this top end of the virtual address space, the allocation pointer will roll-over to the bottom end 134, as indicated by the path 136.

A consequence of sequential advancement of the allocation pointer AP through the virtual address space is that under most conditions, there will be a supply of large contiguous regions of free virtual memory pages "above" the allocation pointer (AP), where the pages "above" the allocation pointer (AP) are neighboring pages in the direction of incrementing the address pointer (AP). For example, the region 137 above the allocation pointer (AP) corresponds to a free virtual page table in which none of its pages are allocated. The allocation pointer (AP) will reside in a region 138 from which pages are currently being allocated. There will be a region 139 below the region 138 corresponding to a page table from which allocated pages eventually become de-allocated. The virtual address space below the region 139 tends to become more sparsely populated with allocated pages at further distances below the virtual address of the allocation pointer (AP). Thus, pages below the allocation pointer (AP) tend to become de-allocated, and page tables further below the allocation pointer (AP) tend to become de-allocated once all of their pages become de-allocated.

Figure 10:
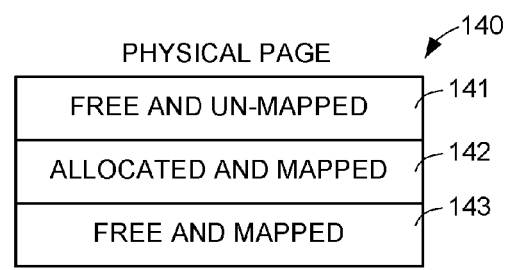
FIG. 10 shows states of a virtual or physical page of memory in the digital computer of FIG. 1.

FIG. 10 shows states of a virtual or physical page of memory in the digital computer of FIG. 1. A page has either a state 141 of free and un-mapped, or a state 142 of allocated and mapped, or a state 143 of free and mapped. A physical page may remain in the free and mapped state for a considerable amount of time to avoid processor cycles required for un-mapping the physical page from a page table.

FIG. 11 shows a table 150 of counts of allocated pages 151 and counts of free and mapped pages 152 in the multi-level page table (60 of FIG. 3). The table 150 is indexed by a virtual page table address whenever a page is allocated, a page is de-allocated, or a page is mapped or un-mapped. When a page is allocated, the indexed count of allocated pages is incremented. When a page is de-allocated, the indexed count of allocated pages is decremented. When a page is de-allocated but not un-mapped, the count of free and mapped pages is also incremented. When a free and mapped page is un-mapped, then the count of free and mapped pages is decremented. For any given page table, the sum of the count of allocated pages and the count of free and mapped pages is less than or equal to the number of virtual pages in the page table. Any difference is the number of free and un-mapped virtual pages in the page table.

FIG. 12 shows states of a virtual page table in the multi-level page table (60 of FIG. 3). A virtual page table is either free and un-mapped 161, allocated and filling 162, or allocated and evacuating 164.

Figure 13:
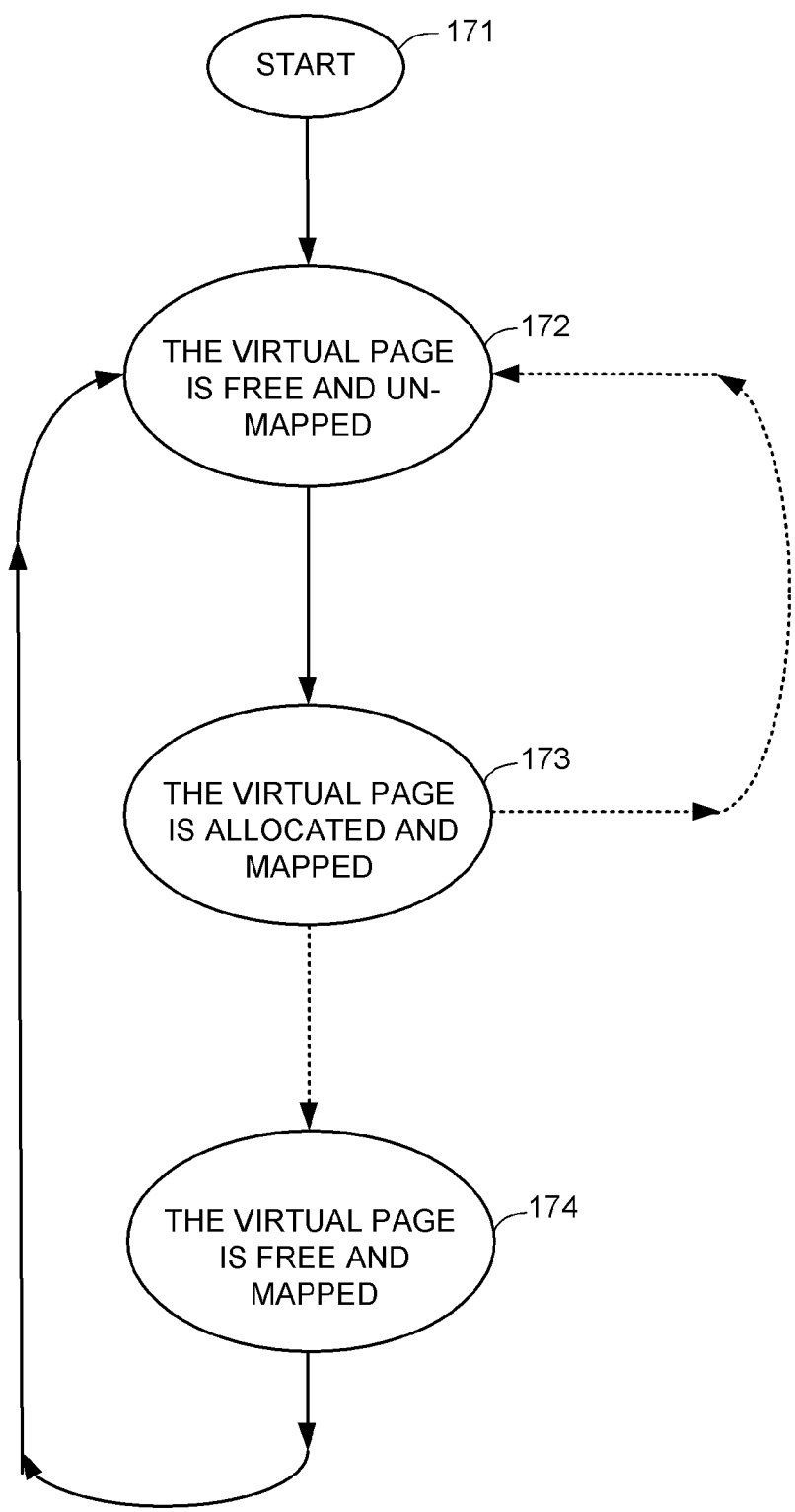
FIG. 13 is a state transition diagram for the states of a virtual page in the multi-level page table of FIG. 3.

FIG. 13 shows states for a virtual page in the multi-level page table (60 of FIG. 3). From an initial state 171, a virtual page is set to a free and un-mapped state 172 when the operating system is restarted in response to a reset of the computer. In response to an allocation request from an application process, a physical page of memory is allocated to the application process and mapped to the virtual page, so that the virtual page transitions from the free and un-mapped state 172 to an allocated and mapped state 173.

In response to a de-allocation request from the application process or in response to termination of the application process, the physical page of memory is de-allocated so that the virtual page transitions from the allocated and mapped state 173. In this case, from the allocated and mapped state 173, the virtual page may either transition back to the free and mapped state 173 or the virtual page may transition to the free and mapped state 174. As further described below with reference to FIG. 16, the transition from the allocated and mapped state 173 to the free and mapped state 173 occurs with a probability that is the inverse of a superlinear function of the number of allocated pages remaining in the virtual page table containing the virtual page.

From the free and mapped state 174, as needed for re-allocation or for recovery of memory of the page table, the physical page is un-mapped from the virtual page and either placed in the pool of free and un-mapped physical pages or relocated to another virtual page. In either case, the virtual page transitions from the free and mapped state 174 back to the free and un-mapped state 172.

Figure 14:
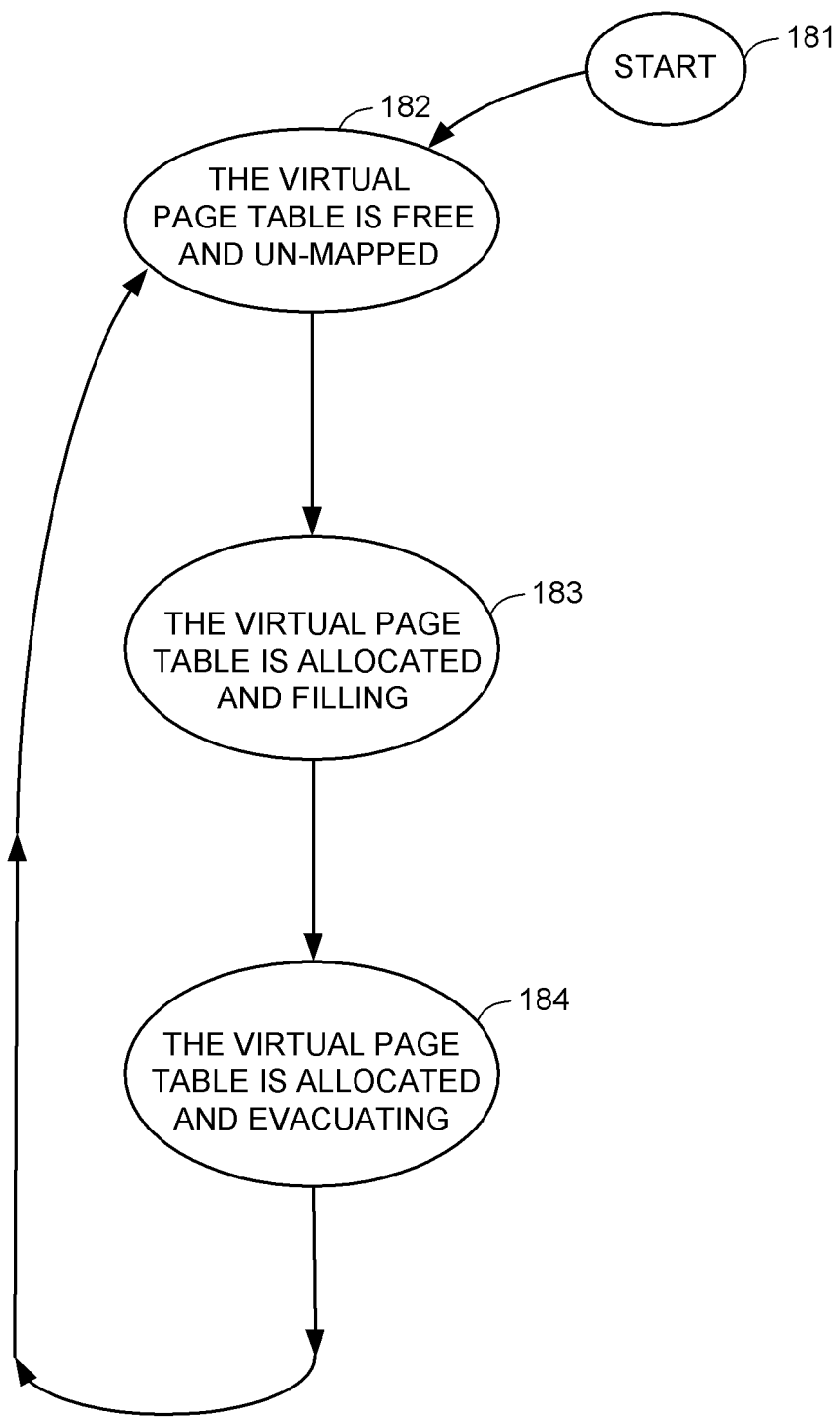
FIG. 14 is a state transition diagram for the states of a virtual page table in the multi-level page table of FIG. 3.

FIG. 14 shows states of a virtual page table in the multi-level page table (60 of FIG. 3). From an initial state 181, a virtual page table is set to a free and un-mapped state 182 when the operating system is restarted in response to a reset of the computer. In response to an allocation request from an application process during an initial scan, physical memory is allocated and mapped to the virtual page table, so that the virtual page table transitions from the free and un-mapped state 182 to the allocated and filling state 183. (This physical memory allocated to the virtual page table is mapped to the virtual page table by placing the base address of the physical memory into a respective directory entry 88 of the page directory 63, and this respective directory entry corresponds to the virtual page table as indexed by the virtual address of the virtual page table from the directory field 67 of the virtual address 61 in FIG. 3.)

In response to an allocation request from an application process, an initial allocation of physical pages to virtual pages in the page table is completed, so that the virtual page table transitions from the state 183 to the state 184 in which the virtual page table is allocated and evacuating. In state 184, in response to de-allocation of a page in the page table and finding that the count of allocated pages in the virtual page table reaches zero, any free and mapped pages are un-mapped and the physical memory of the virtual page table is un-mapped, and the state of the virtual page table transitions from the state 184 back to the state 182 of free and un-mapped.

Figure 15:
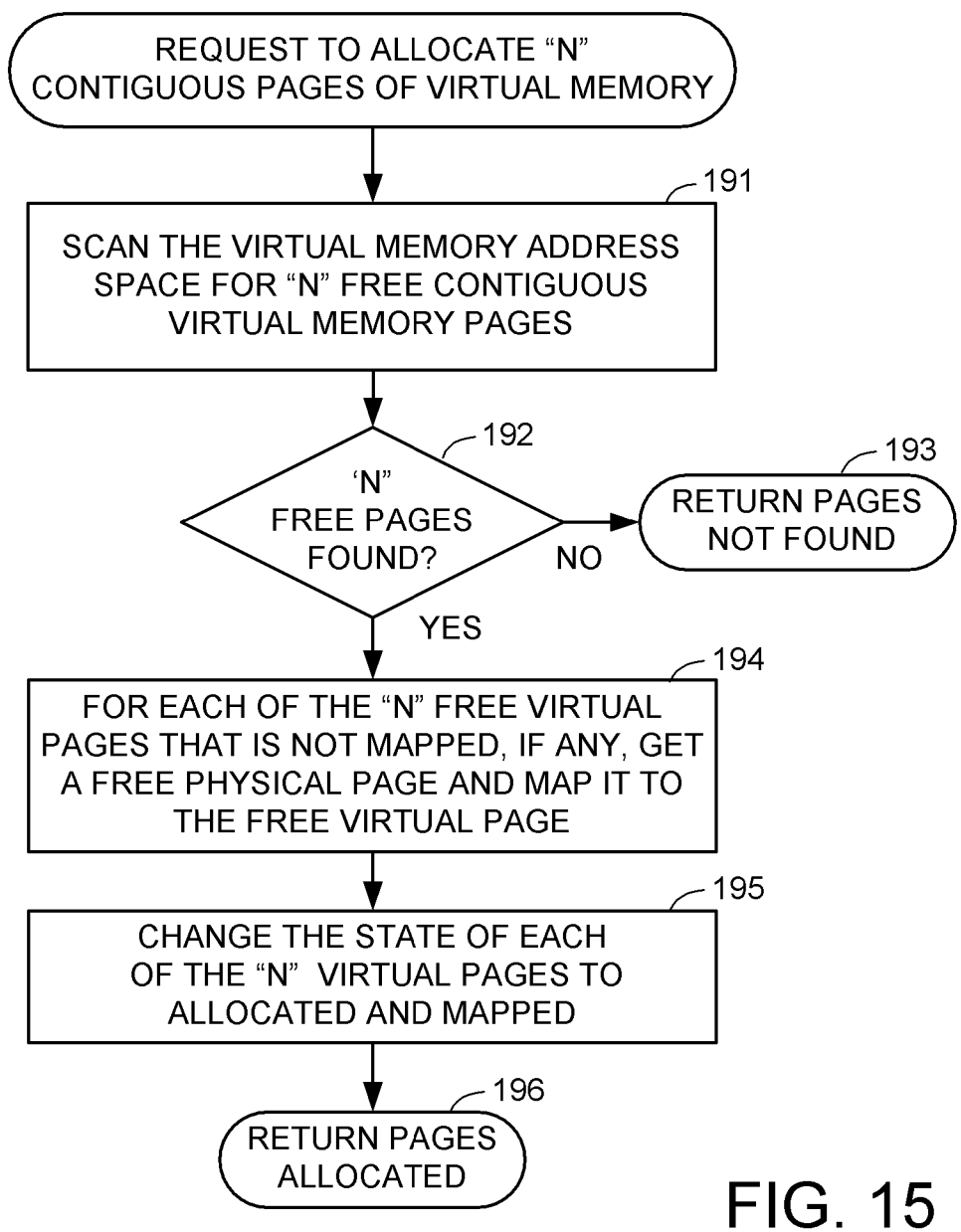
FIG. 15 is a flowchart of a subroutine for processing a request from an application process to allocate a specified number "N" of contiguous pages of virtual memory.

FIG. 15 shows a subroutine of the dynamic memory allocation program (46 in FIG. 2) for processing a request from an application process to allocate a specified number "N" of contiguous pages of virtual memory. In a first step 191, the operating system scans the virtual memory address space for "N" free contiguous virtual memory pages in one or more page tables. For example, the scan begins at the allocation pointer (AP) in FIG. 9. Execution continues from step 191 to step 192. In step 192, if such "N" free pages are not found, then execution branches to step 193 to return an error code indicating that the requested pages were not found. Otherwise, execution continues from step 192 to step 194.

In step 194, for each of the "N" free pages that is not mapped, if any, a free physical page is obtained and mapped to the free virtual page. For example, a free physical page is taken from the pool of free and un-mapped physical pages 132 in FIG. 9, or if this pool is empty, then the a free and mapped page is un-mapped and re-mapped to the free virtual page. For example, a free and mapped page can be found by indexing the table in FIG. 11 to find a virtual page table having free and mapped pages, then searching the map of allocated, mapped, and free pages of memory 52 in FIG. 2 or scanning the virtual page table 64 in FIG. 3 to find a free and mapped page in the virtual page table having free and mapped pages. Then, in step 195, the state of each of the "N" virtual pages is changed to allocated and mapped. Finally, in step 196, execution returns with an indication of the virtual addresses of the "N" pages that were allocated.

Figure 16:
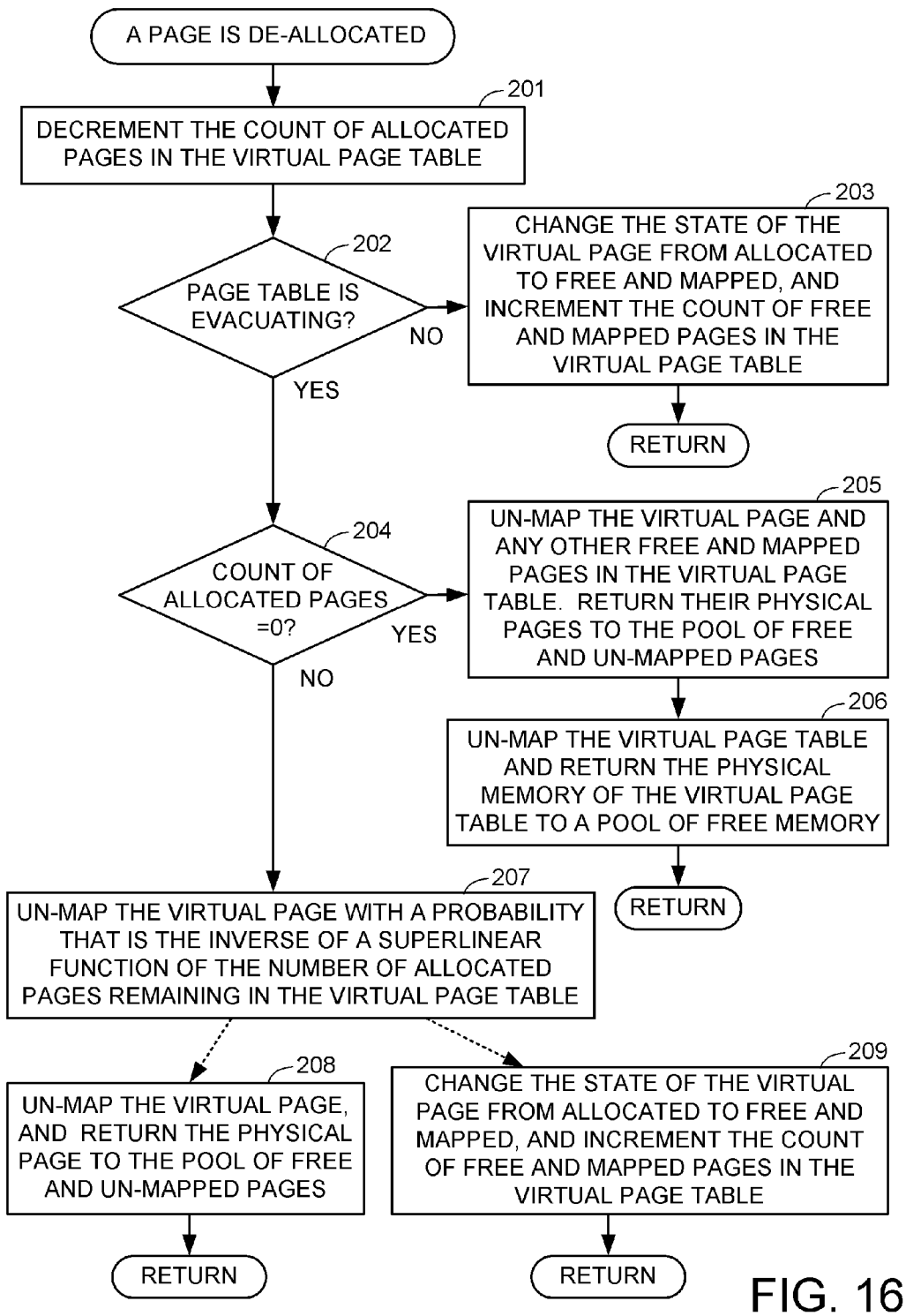
FIG. 16 is a flowchart of a subroutine invoked when a page is de-allocated.

FIG. 16 shows a subroutine of the dynamic memory allocation program (46 in FIG. 2) that is invoked when a page is de-allocated. In a first step 201, the count of allocated pages in the virtual page table is decremented. (For example, the count of allocated pages in the virtual page table is maintained in the table 150 of FIG. 11 as described above.) Next, in step 202, if the virtual page table is not evacuating, then execution branches to step 203. For example, a virtual page table is initially set to a state of not evacuating when physical memory is initially allocated to the virtual page table or when the allocation pointer (AP in FIG. 9) is incremented into the virtual address range of the virtual page table, and the virtual page table is set to a state of evacuating when the allocation pointer (AP) is incremented out of the virtual address range of the virtual page table. In this case, the page table is still becoming filled with allocated pages, so that the number of allocated pages in the page table is not a good indication of whether or not the de-allocated page should be un-mapped. Until the page table has become populated with at least a majority of allocated pages, the number of allocated pages is not a good indication of whether or not to un-map the de-allocated page. In step 203, the state of the virtual page is changed from allocated to free and mapped, and the count of free and mapped pages in the virtual page table is incre-mented. (For example, the count of free and mapped pages in the virtual page table is maintained in the table 150 of FIG. 11 as described above.) After step 203, execution returns.

In step 202, if the page table is evacuating, then execution continues from step 202 to step 204. In this case, the page table has been populated with at least a majority of allocated pages of the memory. In step 204, if the count of allocated pages is zero (as a result of step 201), then execution branches from step 204 to step 205. In step 205, the de-allocated virtual page is un-mapped and any other free and mapped pages in the virtual page table are also un-mapped. The physical page of the de-allocated virtual page and the physical pages of any other free and mapped pages that are un-mapped are returned to the pool of free memory (e.g., the pool of free and un-mapped physical pages 132 in FIG. 9). Execution continues from step 205 to step 206. In step 206, the virtual page table is un-mapped and the physical memory of the virtual page table is returned to a pool of free memory. After step 206, execution returns.

In step 204, if the count of allocated pages is not zero, then execution continues from step 204 to step 207. In step 207, the de-allocated virtual page is un-mapped with a probability (P) that is the inverse of a superlinear function of the number of allocated pages remaining in the virtual page table. Thus, execution may continue from 207 to step 208 to un-map the de-allocated virtual page, or execution may continue from step 207 to step 209 in which the de-allocated virtual page is not un-mapped. The probability of continuing from step 207 to step 208 is given by the probability (P), and the probability of continuing from step 207 to step 209 is given by the probability (1-P). The probability (P) of page un-mapping, for example, is shown in FIG. 8.

In step 208, the de-allocated virtual page is un-mapped, and its un-mapped physical page is returned to the pool of free and un-mapped pages (132 in FIG. 9). After step 208, execution returns.

In step 209, the state of the virtual page is changed from allocated to free and un-mapped, and the count of free and mapped pages in the page table is incremented. (For example, the count of free and mapped pages in the virtual page table is maintained in the table 150 of FIG. 11 as described above.) After step 209, execution returns.

Figure 17:
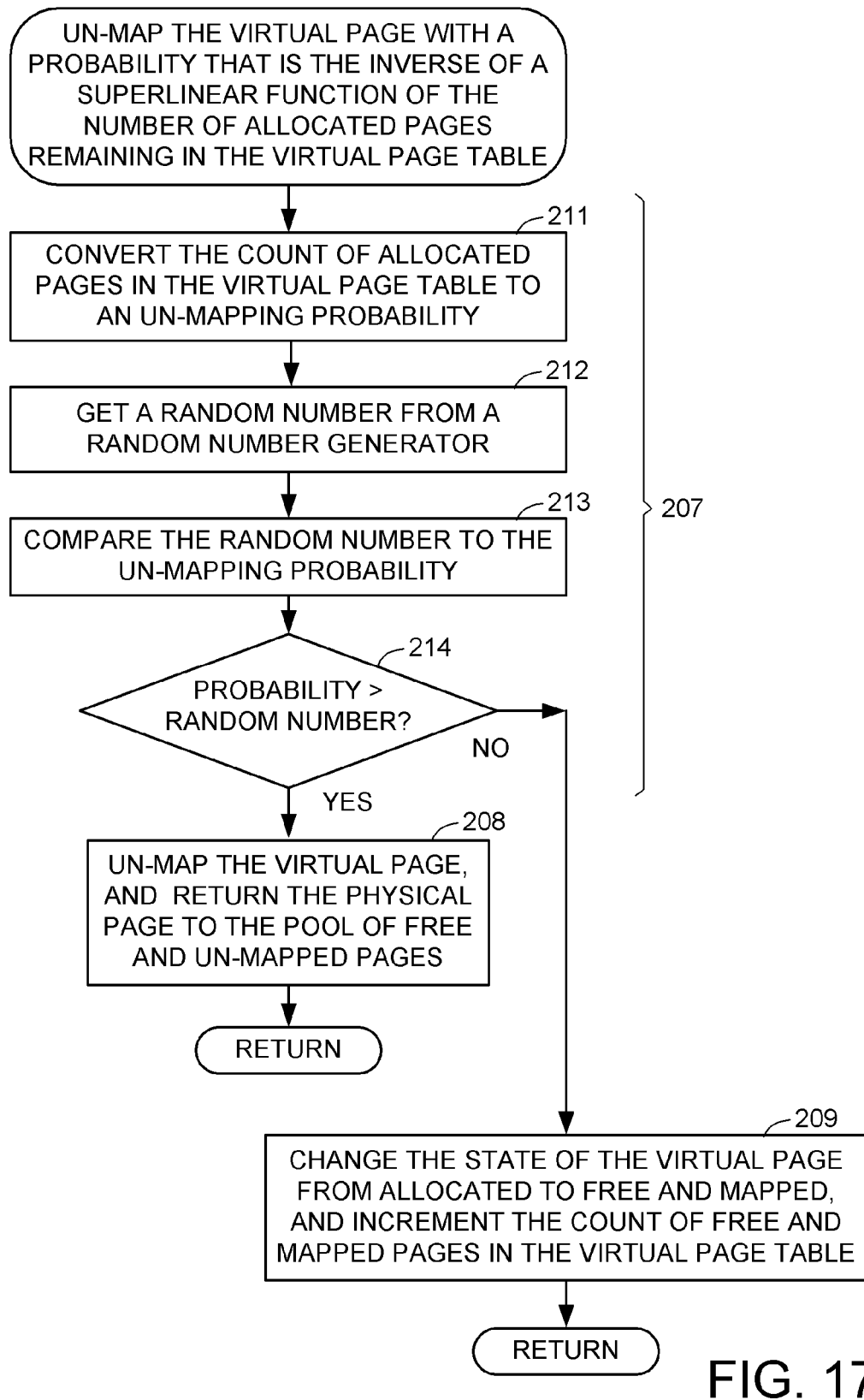
FIG. 17 is a flowchart of a specific way of un-mapping a page with a probability that is the inverse of a superlinear function of the number of allocated pages remaining in the page table.

FIG. 17 show specific operations 211, 212, 213 for performing step 207 of FIG. 16. In step 211 of FIG. 17, the count of allocated pages in the virtual page table is converted to an un-mapping probability (P). For example, the un-mapping probability (P) is computed as a function of the count of allocated pages, as described above with respect to FIG. 8. Or the un-mapping probability is obtained by indexing a pre-programmed function table with the count of allocated pages. Next, in step 212, a random number is obtained from a random number generator. For example, the random number generator is a conventional pseudo-random number generator function provided by a function library associated with a high-level programming language. In step 213 the random number is compared to the un-mapping probability. For example, the range of the un-mapping probability function is the same as the range of the random number generator function. Therefore, in step 214, if the un-mapping probability is greater than the random number, then execution continues to step 208 to un-map the virtual page, and return its un-mapped physical page to the pool of free and un-mapped pages, and then execution returns. Otherwise, in step 214, if the un-mapping probability is not greater than the random number, then execution continues to step 209 to change the state of the virtual page from allocated to free and mapped, and to incre-ment the count of free and mapped pages in the virtual page table, and then execution returns.

Figure 18:
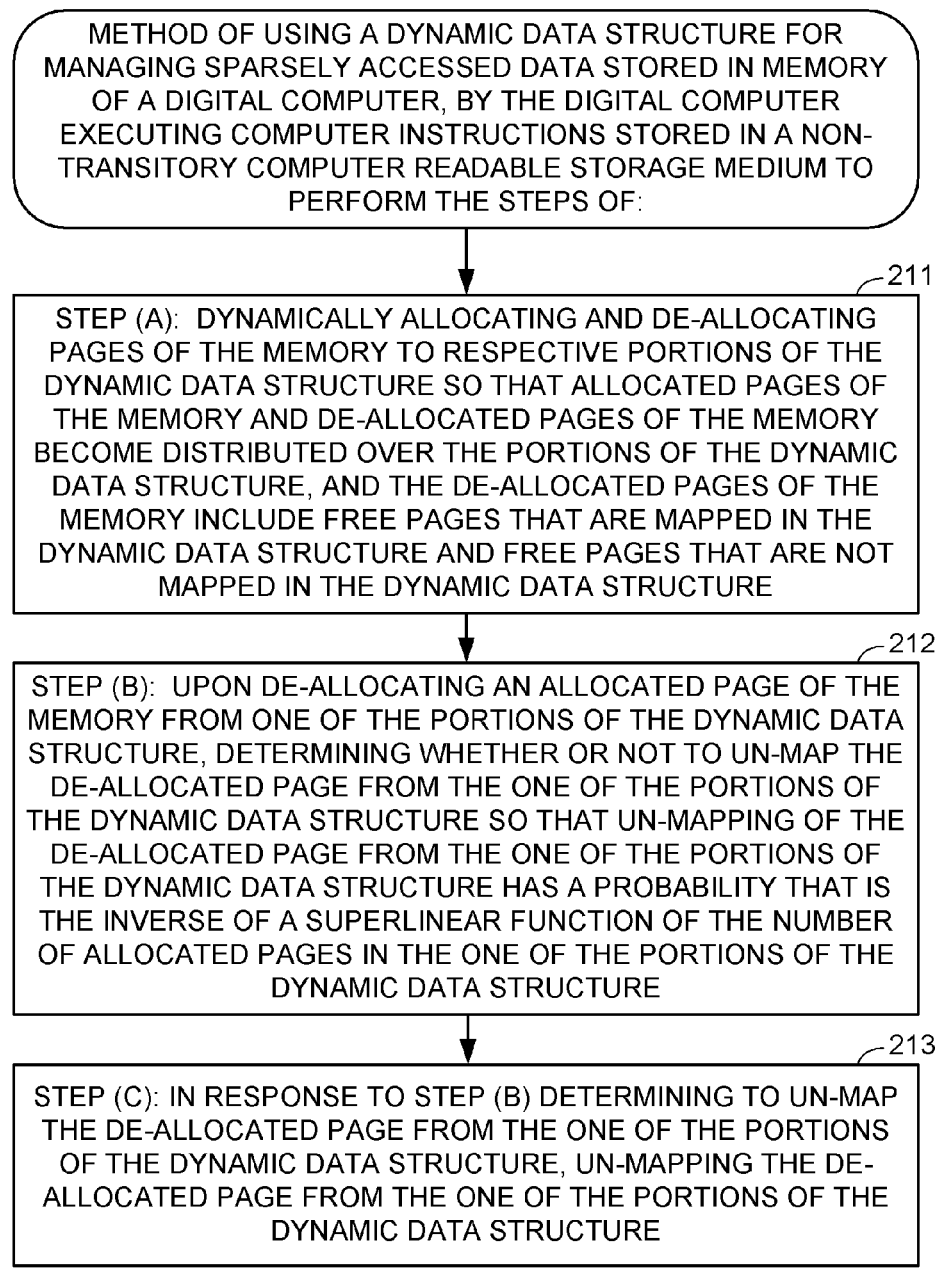
FIG. 18 shows a flowchart of the method provided by the invention in accordance with the one aspect introduced above.

FIG. 18 shows a flowchart of the method provided by the invention in accordance with the one aspect introduced above under the heading "Summary of the Invention." This is a method of using a dynamic data structure for managing sparsely accessed data stored in memory of a digital computer. This method includes a data processor of the digital computer executing computer instructions stored in a non-transitory computer readable storage medium to perform step (a), and then step (b), and then step (c). As shown in box 211, step (a) is the step of dynamically allocating and de-allocating pages of the memory to respective portions of the dynamic data structure so that allocated pages of the memory and de-allocated pages of the memory become distributed over the portions of the dynamic data structure, and the de-allocated pages of the memory include free pages that are mapped in the dynamic data structure and free pages that are not mapped in the dynamic data structure. As shown in box 212, step (b) is the step of, upon de-allocating an allocated page of the memory from one of the portions of the dynamic data structure, determining whether or not to un-map the de-allocated page from the one of the portions of the dynamic data structure so that un-mapping of the de-allocated page from the one of the portions of the dynamic data structure has a probability that is the inverse of a superlinear function of the number of allocated pages in the one of the portions of the dynamic data structure. As shown in box 213, step (c) is the step of, in response to step (b) determining to un-map the de-allocated page from the one of the portions of the dynamic data structure, un-mapping the de-allocated page from the one of the portions of the dynamic data structure.

In view of the above, there has been described a method, apparatus, and non-transitory computer readable storage medium for memory efficient use of a dynamic data structure for managing sparsely accessed data stored in memory of a digital computer. When a dynamic data structure is used for managing sparsely accessed data stored in memory of a digital computer, pages of the memory are dynamically allocated and de-allocated to respective portions of the dynamic data structure so that the pages become distributed over the portions of the dynamic data structure and the de-allocated pages include free pages that are mapped in the dynamic data structure and free pages that are not mapped in the dynamic data structure. To reduce memory fragmentation and recover memory, upon de-allocating a page of memory from a portion of the data structure, a determination is made whether or not to un-map the de-allocated page from the portion of the dynamic data structure so that un-mapping of the de-allocated page has a probability that is the inverse of a superlinear function of the number of allocated pages in the portion of the dynamic data structure.

What is claimed is:

1. A method of using a dynamic data structure for managing sparsely accessed data stored in memory of a digital computer, said method comprising a data processor of the digital computer executing computer instructions stored in a non-transitory computer readable storage medium to perform the steps of:
   (a) dynamically allocating and de-allocating pages of the memory to respective portions of the dynamic data structure so that allocated pages of the memory and de-allocated pages of the memory become distributed over the portions of the dynamic data structure, and the de-allocated pages of the memory include free pages that are mapped in the dynamic data structure and free pages that are not mapped in the dynamic data structure;
   (b) upon de-allocating an allocated page of the memory from one of the portions of the dynamic data structure, determining whether a probability of un-mapping the de-allocated page from said one of the portions of the dynamic data structure is the inverse of a superlinear function of the number of allocated pages in said one of the portions of the dynamic data structure;
   (c) based on the determination of the probability, determining whether or not to un-map the de-allocated page from said one of the portions of the dynamic data structure; and
   (d) in response to step (c) determining to un-map the de-allocated page from said one of the portions of the dynamic data structure, un-mapping the de-allocated page from said one of the portions of the dynamic data structure.

2. The method as claimed in claim 1, wherein the dynamic data structure is a multilevel page table and the portions of the dynamic data structure are page tables providing base addresses of the pages of the memory, and the method further includes the data processor executing the computer instructions stored in the non-transitory computer readable storage medium to use the dynamic data structure for translating virtual addresses of the pages of the memory to physical addresses of the pages of the memory.

3. The method as claimed in claim 1, wherein the method further includes the data processor executing the computer instructions stored in the non-transitory computer readable storage medium to allocate the pages of the memory to an application process in response to allocation requests from an application process, and to de-allocate the pages of memory in response to de-allocation requests from the application process.

4. The method as claimed in claim 1, wherein step (a) further includes populating said one of the portions of the dynamic data structure with at least a majority of allocated pages of the memory, and wherein step (b) is not performed until said one of the portions of the dynamic data structure has been populated with at least a majority of allocated pages of the memory.

5. The method as claimed in claim 1, wherein step (b) further includes computing the probability that is the inverse of a superlinear function of the number of allocated pages in said one of the portions of the dynamic data structure, and comparing the computed probability to a random number in order to determine whether or not to un-map the de-allocated page from said one of the portions of the dynamic data structure.

6. The method as claimed in claim 1, wherein step (a) includes maintaining a running count of allocated pages of the memory in said each portion of the dynamic data structure, and step (b) includes using the running count of allocated pages in said one of the portions of the dynamic data structure to determine whether or not to un-map the de-allocated page from said one of the portions of the dynamic data structure.

7. The method as claimed in claim 6, which further includes responding to the running count of allocated pages in said one of the portions of the dynamic data structure being decremented to zero by un-mapping free and mapped pages in said one of the portions of the dynamic data structure so that all free and mapped pages in said one of the portions of the dynamic data structure become un-mapped.

8. A digital computer comprising a data processor, memory, and a non-transitory computer readable storage medium storing computer instructions that, when executed by the data processor, use a dynamic data structure for managing sparsely accessed data in the memory by performing the steps of:

(a) dynamically allocating and de-allocating pages of the memory to respective portions of the dynamic data structure so that allocated pages of the memory and de-allocated pages of the memory become distributed over the portions of the dynamic data structure, and the de-allocated pages of the memory include free pages that are mapped in the dynamic data structure and free pages that are not mapped in the dynamic data structure;

(b) upon de-allocating an allocated page of the memory from one of the portions of the dynamic data structure, determining whether a probability of un-mapping the de-allocated page from said one of the portions of the dynamic data structure is the inverse of a superlinear function of the number of allocated pages in said one of the portions of the dynamic data structure;

(c) based on the determination of the probability, determining whether or not to un-map the de-allocated page from said one of the portions of the dynamic data structure; and (d) in response to step (c) determining to un-map the de-allocated page from said one of the portions of the dynamic data structure, un-mapping the de-allocated page from said one of the portions of the dynamic data structure.

9. The digital computer as claimed in claim 8, wherein the dynamic data structure is a multi-level page table and the portions of the dynamic data structure are page tables providing base addresses of the pages of the memory, and the method further includes the data processor executing the computer instructions stored in the non-transitory computer readable storage medium to use the dynamic data structure for translating virtual addresses of the pages of the memory to physical addresses of the pages of the memory.

10. The digital computer as claimed in claim 8, wherein the computer instructions, when executed by the data processor, further perform the steps of allocating the pages of the memory to an application process in response to allocation requests from the application process, and de-allocating the pages of the memory in response to de-allocation requests from the application process.

11. The digital computer as claimed in claim 8, wherein step (a) further includes populating said one of the portions of the dynamic data structure with at least a majority of allocated pages of the memory, and wherein step (b) is not performed until said one of the portions of the dynamic data structure has been populated with at least a majority of allocated pages of the memory.

12. The digital computer as claimed in claim 8, wherein step (b) further includes computing the probability that is the inverse of a superlinear function of the number of allocated pages in said one of the portions of the dynamic data structure, and comparing the computed probability to a random number in order to determine whether or not to un-map the de-allocated page from said one of the portions of the dynamic data structure.

13. The digital computer as claimed in claim 8, wherein step (a) includes maintaining a running count of allocated pages of the memory in said each portion of the dynamic data structure, and step (b) includes using the running count of allocated pages in said one of the portions of the dynamic data structure to determine whether or not to un-map the de-allocated page from said one of the portions of the dynamic data structure.

14. The digital computer as claimed in claim 13, wherein the computer instructions, when executed by the data processor, further perform the step of responding to the running count of allocated pages in said one of the portions of the dynamic data structure being decremented to zero by un-mapping free and mapped pages in said one of the portions of the dynamic data structure so that all free and mapped pages in said one of the portions of the dynamic data structure become un-mapped.

15. A non-transitory computer-readable storage medium containing computer instructions that, when executed by a data processor, perform the steps of:

(a) dynamically allocating and de-allocating pages of the memory to respective portions of the dynamic data structure so that allocated pages of the memory and de-allocated pages of the memory become distributed over the portions of the dynamic data structure, and the de-allocated pages of the memory include free pages that are mapped in the dynamic data structure and free pages that are not mapped in the dynamic data structure;

(b) upon de-allocating an allocated page of the memory from one of the portions of the dynamic data structure, determining whether a probability of un-mapping the de-allocated page from said one of the portions of the dynamic data structure is the inverse of a superlinear function of the number of allocated pages in said one of the portions of the dynamic data structure;

(c) based on the determination of the probability, determining whether or not to un-map the de-allocated page from said one of the portions of the dynamic data structure; and (d) in response to step (c) determining to un-map the de-allocated page from said one of the portions of the dynamic data structure, un-mapping the de-allocated page from said one of the portions of the dynamic data structure.

16. The non-transitory computer-readable storage medium as claimed in claim 15, wherein the dynamic data structure is a multi-level page table and the portions of the dynamic data structure are page tables providing base addresses of the pages of the memory, and the method further includes the data processor executing the computer instructions stored in the non-transitory computer readable storage medium to use the dynamic data structure for translating virtual addresses of the pages of the memory to physical addresses of the pages of the memory.

17. The non-transitory computer-readable storage medium as claimed in claim 15, wherein the computer instructions, when executed by the data processor, further perform the steps of allocating the pages of the memory to an application process in response to allocation requests from the application process, and de-allocating the pages of the memory in response to de-allocation requests from the application process.

18. The non-transitory computer-readable storage medium as claimed in claim 15, wherein step (a) further includes populating said one of the portions of the dynamic data structure with at least a majority of allocated pages of the memory, and wherein step (b) is not performed until said one of the portions of the dynamic data structure has been populated with at least a majority of allocated pages of the memory.

19. The non-transitory computer-readable storage medium as claimed in claim 15, wherein step (b) further includes computing the probability that is the inverse of a superlinear function of the number of allocated pages in said one of the portions of the dynamic data structure, and comparing the computed probability to a random number in order to determine whether or not to un-map the de-allocated page from said one of the portions of the dynamic data structure.

20. The non-transitory computer-readable storage medium as claimed in claim 15, wherein step (a) includes maintaining a running count of allocated pages of the memory in said each portion of the dynamic data structure, and step (b) includes using the running count of allocated pages in said one of the portions of the dynamic data structure to determine whether or not to un-map the de-allocated page from said one of the portions of the dynamic data structure.

* * * * *